(12) United States Patent
Duffy

(10) Patent No.: US 8,678,436 B2
(45) Date of Patent: Mar. 25, 2014

(54) SUPPORT BRACKET FOR A STEERING COLUMN ASSEMBLY

(75) Inventor: Patrick Anthony Duffy, Stourport on Severn (GB)

(73) Assignee: TRW Automotive US LLC, Livonia, MI (US)

( * ) Notice: Subject to any disclaimer, the term of this patent is extended or adjusted under 35 U.S.C. 154(b) by 198 days.

(21) Appl. No.: 13/062,379

(22) PCT Filed: Sep. 4, 2009

(86) PCT No.: PCT/IB2009/053872
§ 371 (c)(1),
(2), (4) Date: Jul. 21, 2011

(87) PCT Pub. No.: WO2010/026552
PCT Pub. Date: Mar. 11, 2010

(65) Prior Publication Data
US 2011/0278426 A1    Nov. 17, 2011

(30) Foreign Application Priority Data
Sep. 6, 2008   (GB) .................................. 0816352.9

(51) Int. Cl.
*B62D 1/19* (2006.01)
*B62D 1/16* (2006.01)

(52) U.S. Cl.
CPC .............. *B62D 1/195* (2013.01); *B62D 1/192* (2013.01); *B62D 1/16* (2013.01)
USPC ....................................................... 280/777

(58) Field of Classification Search
USPC ............. 280/777, 779; 188/371; 74/492, 493
See application file for complete search history.

(56) References Cited

U.S. PATENT DOCUMENTS 4,884,778 A * 12/1989 Yamamoto ..................... 248/548
5,390,955 A *  2/1995 Kaliszewski et al. ......... 280/777
(Continued)

FOREIGN PATENT DOCUMENTS

EP   1839994 A2   10/2007
GB   1376580 A    12/1974
(Continued)

OTHER PUBLICATIONS

Search Report for GB0816352.9 dated Dec. 4, 2008.
(Continued)

*Primary Examiner* — Paul N Dickson
*Assistant Examiner* — Robert A Coker
(74) *Attorney, Agent, or Firm* — MacMillan, Sobanski & Todd, LLC

(57) ABSTRACT

A support bracket assembly for a steering column assembly comprises a first bracket part, a second bracket part which is fixed to the vehicle by at least one fastener, and at least one capsule which comprises a main body fixed to the first bracket part by a frangible connector. The main body of the capsule is fixed to the second bracket part by the at least one fastener. The main body includes at least one opening which is aligned with a corresponding opening in the first bracket part and the two aligned openings are filled with a frangible material that forms part of the frangible connector which secures the capsule to the first bracket part. A further opening is provided in the second bracket part which is coaxial with an opening in the capsule and filled with additional frangible material which forms a frangible connection between the capsule and the second bracket part.

8 Claims, 3 Drawing Sheets

(56) References Cited

U.S. PATENT DOCUMENTS

| | | | |
|---|---|---|---|
| 5,704,254 A * | 1/1998 | Thomas et al. | 74/492 |
| 5,788,279 A * | 8/1998 | Pfannebecker | 280/777 |
| 5,899,116 A | 5/1999 | Armstrong et al. | |
| 6,419,269 B1 * | 7/2002 | Manwaring et al. | 280/775 |
| 6,450,532 B1 * | 9/2002 | Ryne et al. | 280/777 |
| 6,761,376 B2 * | 7/2004 | Riefe et al. | 280/777 |
| 7,228,755 B2 * | 6/2007 | Armstrong et al. | 74/493 |
| 7,300,071 B2 * | 11/2007 | Lee | 280/777 |
| 7,607,694 B2 | 10/2009 | Shinohara et al. | |
| 2005/0200113 A1 | 9/2005 | Cymbal et al. | |
| 2006/0226646 A1 * | 10/2006 | Armstrong et al. | 280/777 |
| 2007/0138781 A1 | 6/2007 | Cuiller et al. | |

FOREIGN PATENT DOCUMENTS

| | | | |
|---|---|---|---|
| JP | 8072728 A | 3/1996 |
| JP | 8188161 A | 7/1996 |
| JP | 2001341653 A | 12/2001 |
| JP | 2003341526 A | 12/2003 |
| KR | 100323500 B1 | 1/2002 |
| KR | 20030008563 A | 1/2003 |

OTHER PUBLICATIONS

International Search Report for PCT/IB2009/053872 dated May 13, 2010.

CN200980141692.9—1st Office Action, CN Nat'l Phase of PCT/IB2009/053872.

EP09811184.2 European Search Report for PCT/IB2009/053872.

* cited by examiner

SUPPORT BRACKET FOR A STEERING COLUMN ASSEMBLY

CROSS-REFERENCE TO RELATED APPLICATIONS

This application is a national stage of International Application No. PCT/IB2009/053872 filed Sep. 4, 2009 which claims priority to Great Britain Patent Application No. 0816352.9 filed Sep. 6, 2008, both disclosures of which are incorporated herein by reference.

BACKGROUND OF THE INVENTION

This invention relates to improvements in support brackets for use in collapsible steering column assemblies for vehicles to permit collapse during a crash.

Steering column assemblies for automotive vehicles and the like are increasingly required to be adjustable for steering wheel height known as rake and, in many cases, steering wheel distance known as reach. This requires the column shroud, within which the steering column shaft attached to the steering wheel is rotatably located, to be fixed to the vehicle by a clamp mechanism which can be locked and unlocked to either prevent or permit adjustment of the column shroud position respectively.

One common arrangement uses a telescopic column shroud which comprises an inner member and an outer member—typically two elongate metal tubes—which slide one inside the other to permit reach adjustment. Fixing rails are welded to one of the tubes and are secured to a support bracket by a releasable clamp mechanism. The support bracket is in turn secured to a relatively immobile part of the vehicle chassis. When the clamp mechanism is clamped the fixing rail and support bracket are fixed relative to one another. When unclamped they can move relative to one another to permit the required reach adjustment. Rake adjustment can be achieved by providing a support bracket of which the lower part known as the U bracket is shaped like an inverted U and includes vertically extending slots in its side arms through which the clamp mechanism passes. The clamp mechanism can be moved vertically within these slots, taking the column with it to adjust rake.

In the event of a crash it is desirable for steering column assembly to collapse in a controlled manner. This helps to reduce the forces of a driver colliding with the steering wheel or its airbag. In one known arrangement this controlled collapse is enabled by frangibly connecting the U bracket to the vehicle using one or more shaped blocks called capsules. In a crash the forces on the U bracket are sufficiently high to cause it to break away from the capsules thus permitting the U bracket to move relative to the vehicle. Often some form of energy absorbing device fitted between the U bracket and the vehicle body controls the movement of the support bracket. For example, a deformable strap may be fixed to the U-Bracket and may slide over a fixed anvil, causing progressive distortion of the strap in order to absorb energy.

FIG. 2 shows a typical prior art arrangement of a support bracket which permits this type of movement in a crash. It comprises a two part support bracket, the first bracket part being in the form of the said U bracket fixed to the clamp mechanism and the second part being in the form of an upper mounting bracket fixed to the vehicle (although this other part could be a fixed part of the vehicle body) with the two parts connected via capsules. FIG. 5 shows a typical prior art arrangement of a capsule. The capsule comprises a main body part that is cast or machined in the form of two larger plates between which is sandwiched a small central portion. A profile cut out from the first bracket part is typically designed to be a close fit to a corresponding male profile which is formed in the central portion of the capsule. After assembly of the capsule to the wing of the first bracket part, a frangible material such as a plastic is usually injected through holes in the first bracket part and the capsule which are co-axial. There may be more than one group of such coaxial holes. Once set, the plastic acts as a fusible dowel which is designed to shear when the said prescribed level of force is applied. Typically, the plate thickness of the wing of the first bracket part is slightly less than the gap between the upper and lower plate portions of the capsule so that a proportion of the injected plastic spreads into the said gap and improves the stiffness of the connection between the capsule and the first bracket part.

The fusible capsule defines an anchor point for a fastener which allows the first bracket part to be rigidly fixed to the second bracket part. This is usually by way of an additional large hole in the second bracket part and a coaxial hole in the capsule which receives a fastening bolt. In a crash the first bracket part breaks away from the capsule. When assembled the first and second parts of the bracket are separated by the thickness of the upper plate of the capsule or capsules. The applicants have appreciated that this sandwich construction leads to an undesirable thickness for the support bracket for some applications where space is limited.

BRIEF SUMMARY OF THE INVENTION

According to a first aspect the invention provides a support bracket assembly for use in fixing a shroud of a steering column assembly to a vehicle, the support bracket assembly comprising a first bracket part which is arranged to be fixed to the shroud, a second bracket part which is fixed to the vehicle by at least one fastener, and at least one capsule which comprises a main body fixed to the first bracket part by a frangible connection means, the main body of the capsule being fixed to the second bracket part by the at least one fastener in which the main body includes at least one opening which is aligned with a corresponding opening in the first bracket part, the two aligned openings being filled with a frangible material that forms part of the frangible connection which secures the capsule to the first bracket part, characterised in that a further opening may be provided in the second bracket part which is coaxial with an opening in the capsule and filled with additional frangible material which forms a frangible connection between the capsule and the second bracket part.

In contrast to the prior art case, the process of injecting the frangible material may be at least in part carried out with the second bracket part already assembled to the first bracket part.

By fusing the capsule to both the first bracket part and the second bracket part by a frangible connector, by which we mean a relatively weak/easily sheared, snapped or otherwise broken connection, it is possible to place the first bracket part in direct proximity with the second bracket part. Note that the frangible connections between the second bracket part and the capsule and the first bracket part may include frangible material which has spread into small gaps between their adjacent flat faces as well as that which has filled the coaxial holes. This extra bonding will improve the overall stiffness of the connections. Compared with the prior art this allows the upper part of the main body of the capsule to be eliminated as the capsule is held in place during assembly by the frangible material rather than by the need to sandwich the capsule around the upper and lower surface of the first bracket part. This reduces, by the thickness of one outer plate portion of the typical capsule (i.e. approximately 2 mm to 4 mm), the overall thickness of the attachment means of the column to the vehicle. Such a reduction can sometimes be useful where there is a potential clash of parts due to limited space being available. For instance, it is sometimes difficult to avoid interference between the top of the clamp lever and the head or nut of a column fixing bolt which passes vertically through a nearby capsule.

The openings in the main body of the capsule, first bracket part and second bracket part may be coaxial so that a single frangible connector may pass through all the holes.

The frangible connector may comprise a plastic dowel. The two parts of the support bracket may comprise metal parts, which may be pressed, stamped, moulded or otherwise formed into the required shape.

The frangible material located within the aligned openings, which are preferably through holes, may be moulded in position. It may alternatively comprise a plastic dowel which is pressed into the holes.

The plastic material may be moulded to the first and bracket second parts whilst they are in contact.

There may be multiple through holes in the main body of the capsule, first bracket part and second bracket part to receive multiple plastic dowels. Three dowels may be provided.

The main body of the capsule may comprise a male part which is located within a corresponding female cut-out in an edge of the first bracket part and a base portion which forms a lip that prevents the capsule being pulled up though the female cut-out. The male part may be terminated flush with the upper surface of the first bracket part.

Alternatively the top of the male part may extend slightly above the upper surface of the first bracket part to form an upper collar which may be peened into a counter sunk recess in the second bracket part. This peening helps hold the capsule, first bracket part and second bracket part in place prior to the plastic dowel or molten plastic being introduced into the openings. The collar may therefore be sized prior to insertion into the recess in the second bracket part so that, on assembly and peening to the second bracket part, it is a close fit in the corresponding hole that receives the fastener in the second bracket part.

The second bracket part may comprise a part of the vehicle body. The fastener may comprise a bolt or rivet which passes through a hole in the main body of the capsule. This hole may pass through the male part of the main body.

More than one frangible capsule may be provided. Two is a preferred arrangement.

Other advantages of this invention will become apparent to those skilled in the art from the following detailed description of the preferred embodiments, when read in light of the accompanying drawings.

DETAILED DESCRIPTION OF THE INVENTION

Figure 1:
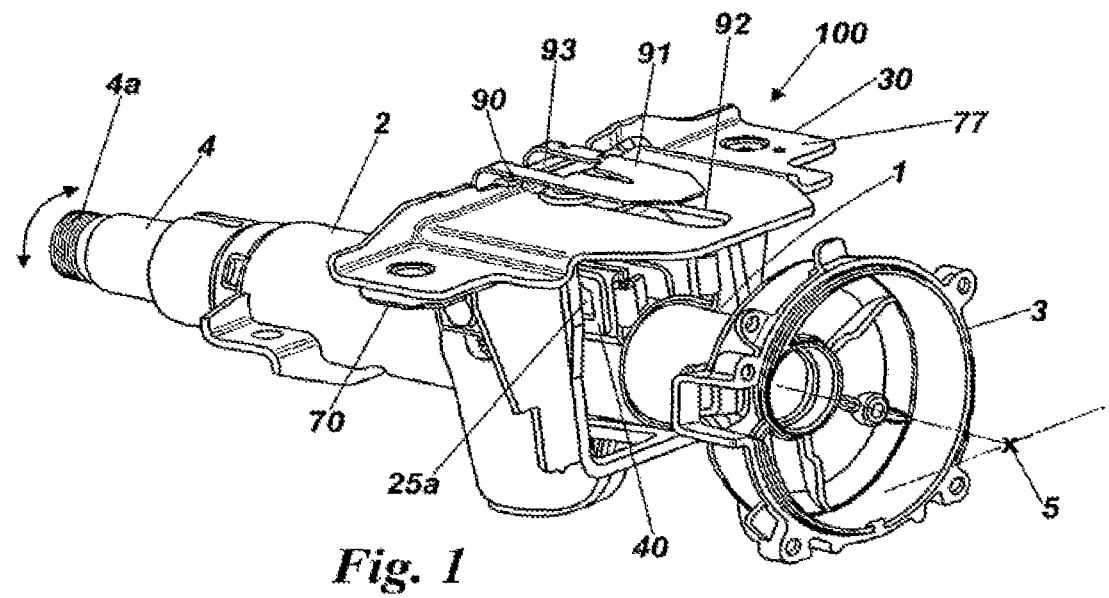
FIG. 1 is a first perspective view of steering column assembly which includes an embodiment of a support bracket assembly.

As shown in FIG. 1 a steering column assembly comprises a telescopic steering column shroud comprising an inner member 1 and an outer member 2 which receives a portion of the inner member 1. The inner and outer members are metal tubes with the inside diameter of the outer member being only slightly greater than the outside diameter of the inner member so as to permit relative movement between them by sliding. In the example of FIG. 1 the inner member 1 passes into a gearbox housing 3 whilst the outer member 2 extends away from that towards a steering wheel which is not shown but which attaches to a shaft 4 at position 4a. This housing 3 may contain a gearbox in the case of an electric power steering system which is driven by an electric motor to provide an assistance torque.

The steering wheel (not shown) is supported by a telescopic steering shaft 4 that is free to rotate within the steering column shroud 1, 2. A bush (not shown) of low friction material such as a plastic is located between the inner and outer members to control the friction that is generated when the two are moved over one another to extend or collapse the steering column either when adjusting reach of the steering wheel or in an accident.

The steering column shroud assembly 1, 2 which may include a gearbox at 3 in the case of an electric power steering system is fixed pivotally to a part of the vehicle body at an axis 5 distal from the steering wheel. At a position closer to the steering wheel than axis 5 it is also fixed by a clamp mechanism to a support bracket assembly 100 which is typically secured to the body of the vehicle by two or more vertical fasteners. The support bracket assembly is typically bolted in place in a region under the dashboard and the clamp mechanism clamps the shroud 1, 2 to the support bracket assembly at a point somewhere between the pivot axis 5 and the steering wheel. The clamp mechanism can be locked or unlocked to allow the rake of the steering column to be adjusted by pivoting about the pivot axis 5. In the case of the column shown in FIG. 1 the reach position of the steering wheel can also be adjusted through the provision of longitudinal slots 25a in the clamping rails which are attached to the outer shroud member 2. When locked the steering column cannot be moved other than in an accident.

Figure 2:
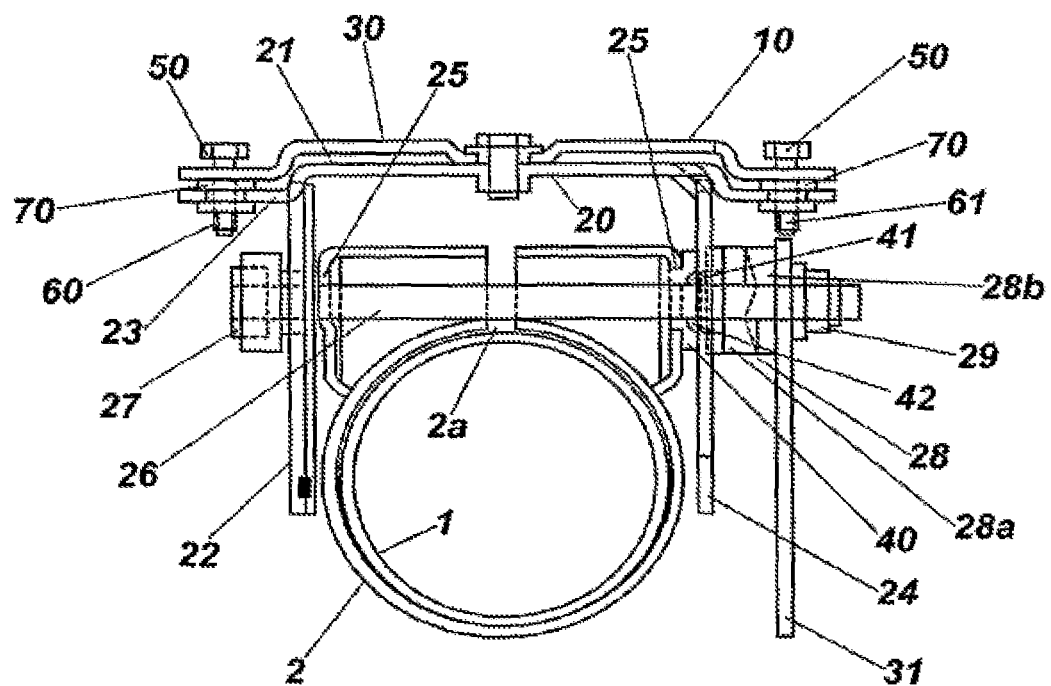
FIG. 2 is a cross section through the support bracket and clamp mechanism of a steering column assembly according to the prior art.

The support bracket assembly and the clamping mechanism are shown schematically in cross section in FIG. 2 of the accompanying drawings. The support bracket is in two parts—a first bracket part 20 which is in the form of a metal sheet pressed into an inverted U-shape, and a second bracket part 30 which is fixed to the vehicle body by at least two fastening bolts 60, 61.

The first bracket part 20 comprises a base 21 of the U lying in a generally horizontal plane above the steering column shroud 1, 2. Two wings 23 extend horizontally outwards from this base. Two arms 22, 24 of the U-shaped bracket depend downwards in a generally vertical plane and extend down either side of fixing rails which are 25 welded or are in some other way attached to the outer shroud member 2. The rails comprise two spaced vertical walls attached to the outer tube 2 on opposing sides of an elongate slot 2a.

A clamp mechanism acts between the two arms 22, 24 of the U-shaped first bracket part 20 to draw them together when locked so that they are squeezed onto the walls of fixing rails 25. It includes a bolt or shaft 26 which passes through vertical slots in the arms 22, 24 of the first bracket part and horizontal slots in the walls of the rails 25. The purpose of these slots, which extend along in the direction of the long axis of the tubular members 1, 2, is to allow the steering column to be telescoped for reach adjustment and moved for rake when the clamp mechanism is unlocked.

A fixed nut 27 is located on one end of the shaft. The other end of the shaft 26 is secured with a cam mechanism 28 that is provided between an adjustable nut 29 and the outer face of the corresponding arm of the U-shaped first bracket part. The cam comprises a fixed portion 28a that is prevented from rotation and carries a set of teeth and a moving portion 28b that together present cam faces that slide over one another. The moving portion is operated by a lever 31 as shown or could be operated by an electric motor.

Rotation of the moving cam portion by rotation of the lever 31 to lock the clamp mechanism increases the length of the cam and this pushes the nut 29 away from the arm 24, causing the shaft 26 to draw the other arm 22 towards the arm 24. This forces the arms of the first bracket part together, in turn pushing the walls of the fixing rails 25 together and closing the slot 2a in the outer tube 2. This reduces the inner diameter of the tube 2 causing it to grip the inner tube 1.

Rotation of the cam to unlock the mechanism has the effect of shortening the length of the cam and thus reduces the tension in the shaft, releasing the grip of the arms on the fixing bracket.

To ensure that the first bracket part and rails cannot slide relative to one another when clamped, a toothed plate 40 carrying two spaced rows of teeth 41,42 is welded to one of the fixing rails 25 alongside one of the elongate slots, and a complimentary set of teeth are provided on the fixed cam part 28a of the clamp mechanism. The toothed rail includes a slot which lines up with the slot in the fixing rail 25. When clamped the teeth on the clamp mechanism mesh together with some of the facing teeth of the toothed plate 40. When unclamped, the clamp mechanism moves away to allow the teeth to disengage fully.

It is important to ensure that the shroud can collapse in a crash in which the driver strikes the steering wheel. The second bracket part is usually fixed to the vehicle structure by at least two bolts 50 which protrude downwards from the vehicle structure and which, on assembly of the column to the vehicle, pass through holes in the second bracket part and co-axial holes in capsules 70 secured to each wing of the U-shaped bracket.

Figure 3:
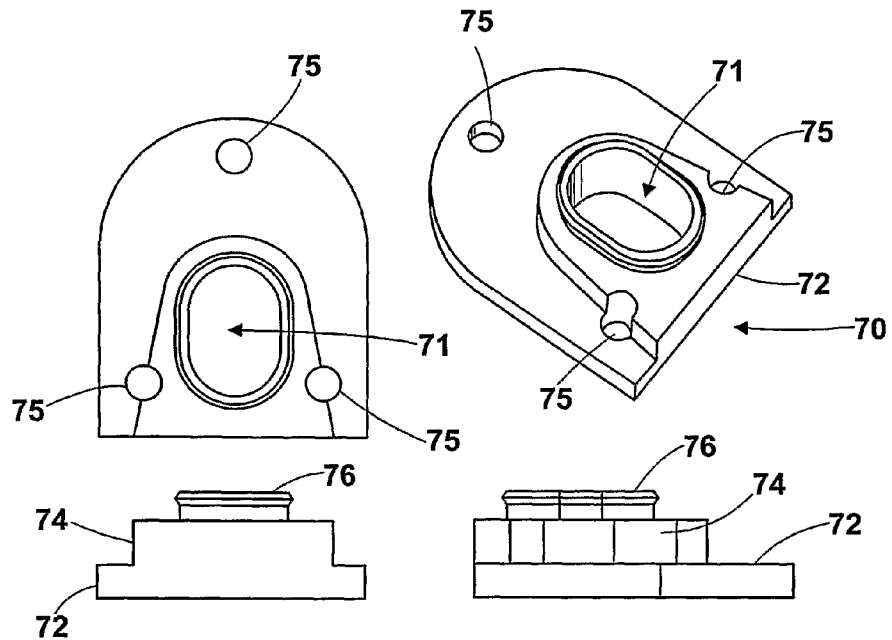
FIG. 3 is a set of views of the main body of the capsules used to connect the first bracket part to the second bracket part.
Figure 4:
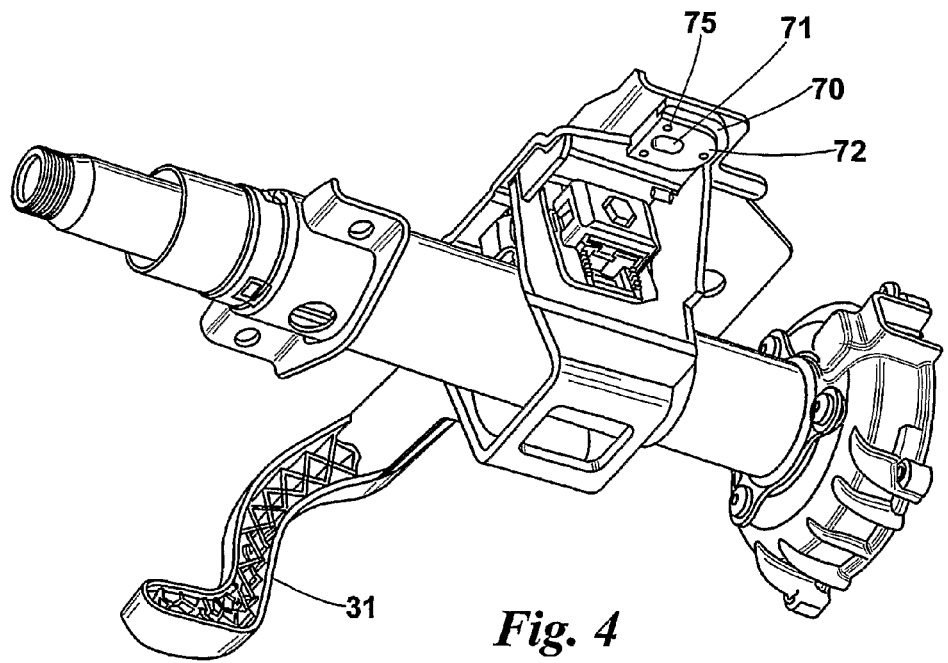
FIG. 4 is an alternative perspective view of the capsules in their position of use.
Figure 5:
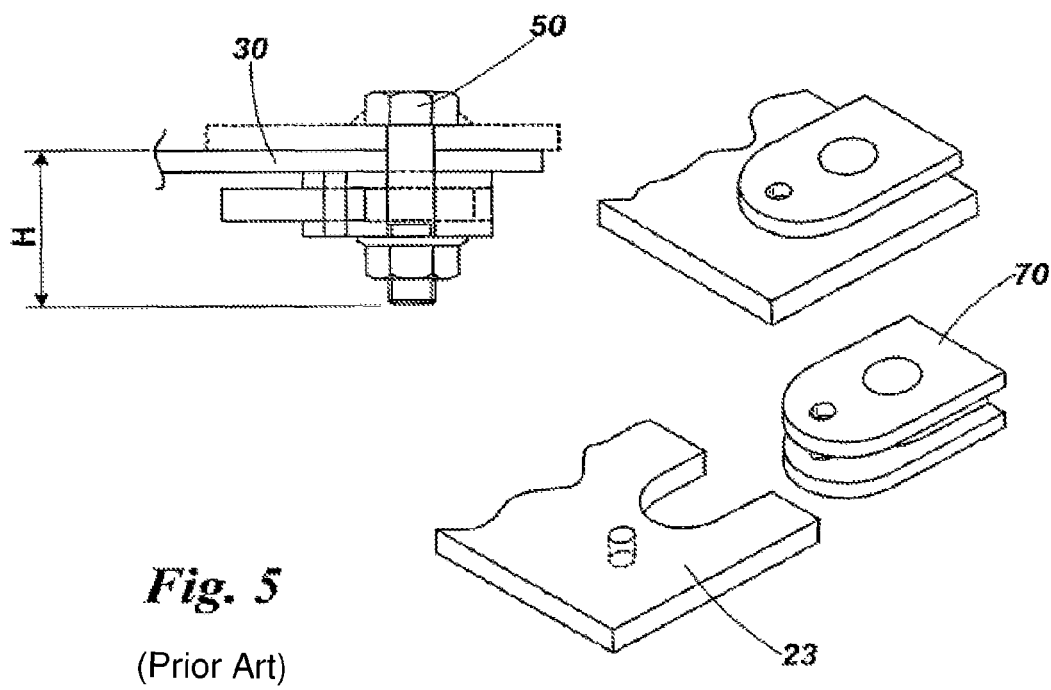
FIG. 5 is a set of views of a prior art capsule prior to installation and when installed.
Figure 6:
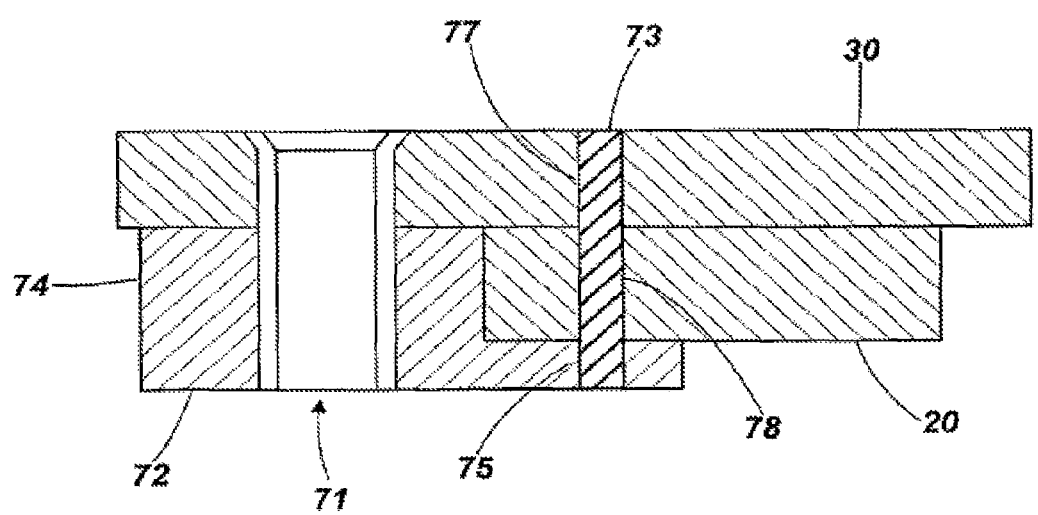
FIG. 6 is a view in cross section from the side of the embodiment of the capsule when installed.

The capsules 70 prior are frangibly secured to the wings 23, which are part of the first bracket part, and each bolt 60, 61 passes through an opening 71 in each capsule. Each capsule 70 comprises a main body as shown in FIG. 3 and three frangible connectors 73 in the form of dowels formed from molten plastic. This is shown in FIG. 6 of the accompanying drawings. Because the main connection from the first bracket part to the second bracket part is through the capsule 70 the first bracket part is designed to break free from the second bracket part when in a crash a prescribed level of force is applied parallel to the steering column axis this force being sufficient to break the plastic dowels 73.

After breakage of the dowels 73, the first bracket part continues to be guided relative to the second bracket part by means of a special bolt and/or washer 90 which is fixed to the first bracket part and slides in a slot 92 (see FIG. 1) in the second bracket part. A deformable strap 91 (see FIG. 1) may be fixed to the first bracket part and may slide over an anvil 93 (see FIG. 1) formed in the second bracket part, causing progressive distortion of the strap in order to absorb energy.

An exemplary embodiment of a specific arrangement of the capsule when assembled is shown in FIG. 6, and the main body prior to assembly in FIG. 3 of the accompanying drawings. The main body comprises a lower part 72 and an upper part 74. The upper part 74 comprises a male body which is received within a complimentary female cut-out in the edge of the wing. The lower part 72 forms a lip which prevents the male part being pulled up through the female cut-out. A hole 71 passes through the male body which receives the bolts 50 which in turn receive nuts at positions 60, 61 in FIG. 2. The top of the male body carries a flared lip 76 which in its position of use is peened into a counter sunk recess in the top surface of the wing of the second bracket part. This, together with the lip formed by the lower part 72, holds the main body of the capsule in place. The lower part 72 is also provided with several through holes 75 which are aligned with corresponding through holes 78 in the wing and also corresponding holes 77 in the support bracket second bracket part. These sets of holes 75,78,77 are filled with plastic dowels 73 which are formed by plastic injected in a molten state to fill the holes. When solidified this forms the frangible connection of the capsule to the wing and also to the second bracket part.

The upper surface of the wing of the first bracket part may be in direct contact with the second bracket part or may be separated by a small amount of the injected plastic material.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. A support bracket assembly for use in fixing a shroud of a steering column assembly to a vehicle, said support bracket assembly comprising: a first bracket part which is arranged to be fixed to said shroud, a second bracket part which is fixed to said vehicle by at least one fastener, and at least one capsule which comprises a main body fixed to said first bracket part by a frangible connection, the main body of said capsule being fixed to said second bracket part by said at least one fastener and in which said main body includes at least one opening which is aligned with a corresponding opening in said first bracket part, such that said at least one main body opening and said at least one first bracket part opening are aligned, and in which said main body and said first bracket part openings are filled with a frangible material that forms part of said frangible connection which secures said capsule to said first bracket part, wherein an opening is provided in said second bracket part which is coaxial with an opening in said first bracket part and filled with additional frangible material which forms a frangible connection between said first bracket part and said second bracket part.

2. A support bracket assembly according to claim 1 wherein said at least one opening of said main body of said capsule, said first bracket part and said second bracket part openings are coaxially aligned and wherein said frangible material connecting said main body opening and said first bracket opening and said additional frangible material connecting said first bracket opening and said second bracket opening is a single frangible connector which passes through each of said main body, first bracket, and second bracket openings.

3. A support bracket according to claim 2 wherein said single frangible connector comprises a plastic dowel.

4. A support bracket according to claim 2 wherein said frangible material located within said aligned main body, first bracket, and second bracket openings is moulded in position.

5. A support bracket according to claim 1 wherein said main body of said capsule comprises a male part which is located within a corresponding female cut-out in an edge of said first bracket part and a base portion which forms a lip that prevents said capsule being pulled up through said female cut-out.

6. A support bracket according to claim 5 wherein said male part is terminated flush with an upper surface of said first bracket part.

7. A support bracket according to claim 5, during assembly, a top of said male part extends slightly above said upper surface of said first bracket part to form an upper collar which, during assembly is peened into a counter sunk recess in said second bracket part.

8. A support bracket according to claim 1 wherein said second bracket part comprises a part of a body of said vehicle.

\* \* \* \* \*